United States Patent [19]

Kramer

[11] 4,381,610

[45] May 3, 1983

[54] SELF-CONTAINED DOWNHOLE COMPASS

[75] Inventor: Melvin G. Kramer, Riverton, Wyo.

[73] Assignee: The Brunton Company, Riverton, Wyo.

[21] Appl. No.: 202,738

[22] Filed: Oct. 31, 1980

[51] Int. Cl.³ .......................................... E21B 47/022
[52] U.S. Cl. ..................................... 33/312; 33/363 K
[58] Field of Search ...................... 33/304, 312, 363 K, 33/313

[56] References Cited

U.S. PATENT DOCUMENTS

| 2,116,350 | 5/1938 | Hewitt | 33/313 |
| 2,190,950 | 2/1940 | Potapenko | 33/312 |
| 2,232,777 | 10/1943 | Boucher . | |
| 2,236,543 | 4/1941 | McFaddan | 33/363 K |
| 2,268,256 | 12/1941 | Knouse | 33/312 |
| 2,492,794 | 12/1949 | Goble et al. | 33/312 X |
| 2,609,513 | 9/1952 | Boucher et al. | 33/312 X |
| 2,996,807 | 8/1961 | Fletcher et al. | 33/313 |
| 3,253,341 | 5/1966 | Bergan . | |
| 3,789,510 | 2/1974 | Richter et al. | 33/304 |

Primary Examiner—William D. Martin, Jr.
Attorney, Agent, or Firm—John E. Reilly

[57] ABSTRACT

A self-contained compass apparatus includes a sensing circuit and power source which are enclosed along with a compass unit within a chamber which is adaptable for suspension at extended distances into a borehole, such as, an oil well, so as to assist in determining direction and orientation of articles, such as tooling, positioned in the well.

4 Claims, 3 Drawing Figures

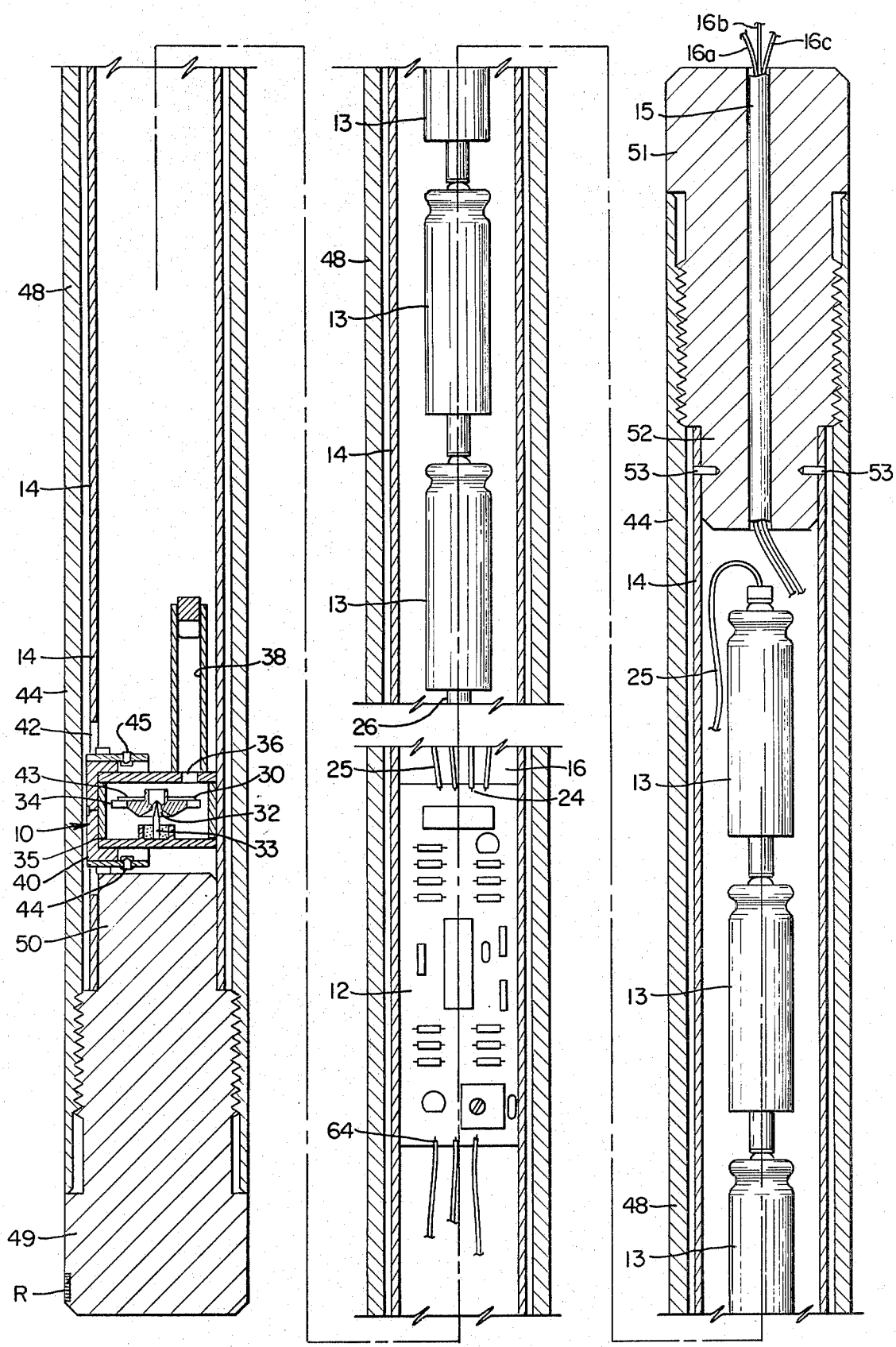

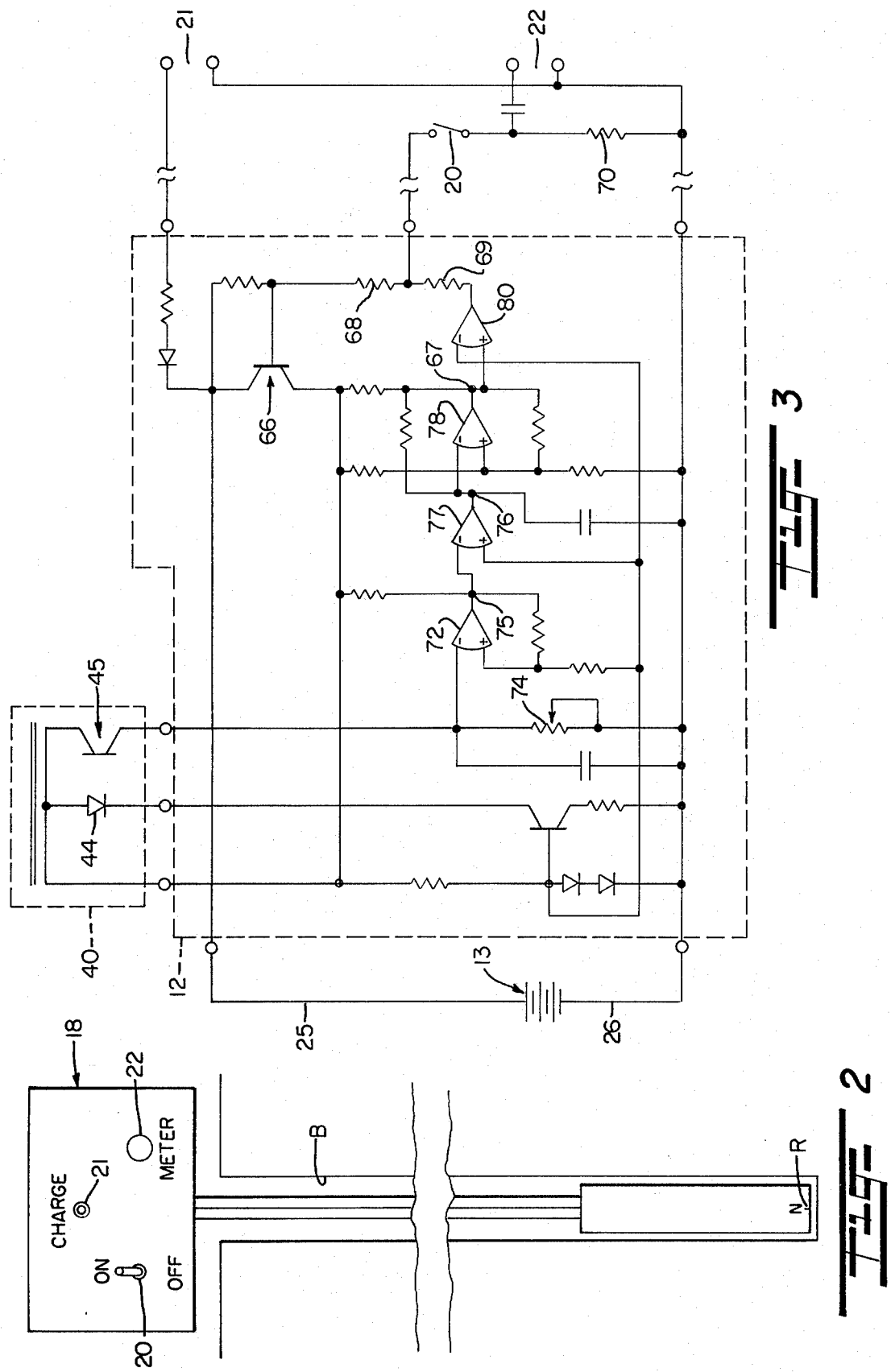

SELF-CONTAINED DOWNHOLE COMPASS

This invention relates to novel and improved surveying instruments, and more particularly relates to a downhole compass apparatus which is specifically adaptable for use in orienting objects in a borehole.

BACKGROUND AND FIELD OF THE INVENTION

In earth boring operations, it is very often necessary to establish proper orientation of tooling, packers and the like at the bottom of the hole. In the past, various types of survey instruments have been devised to perform this function. For instance, U.S. Pat. to Boucher No. 2,232,777 discloses the utilization of an optical sensing arrangement in combination with a compass so that when the sensing arrangement is properly aligned with magnetic North on the compass, it will through a rotating prism transmit light to a photocell and, by means of a signal transmitted to the surface, indicate proper alignment with respect to magnetic North. U.S. Pat. to Bergan No. 3,253,341 similarly senses alignment of an instrument in a downhole apparatus by suspension of a compass unit from a cable. A generator and potentiometer are employed such that the repetition rate of the impulses of the generator will control the rotation of the instrument and permit the position of a wiper arm to be varied in response to movement of the compass element with respect to magnetic North. In such devices and others known in the art, operation of the downhole instrument is both controlled and powered from the earth's surface so as to necessitate costly and bulky transmission wires which run for extended distances through the bore and into the bottom of the hole. Moreover, fairly complex and sophisticated sensing circuits have been required in tracking the movement or rotation of the instrument and compass and in establishing proper orientation of tooling or other devices located downhole.

SUMMARY OF THE INVENTION

It is an object of the present invention to provide for a novel and improved compass instrument which is capable of being extended or suspended in remote locations for the purpose of determining orientation of an assembly with which is associated; and wherein the instrument is greatly simplified and compact in construction as well as being accurate and reliable in operation.

Another object of the present invention is to provide for a novel and improved compass instrument which is capable of being suspended at substantial distances in a borehole, such as an oil well, and wherein the instrument is self-contained to include the necessary sensing circuitry and power source so as to obviate the use of power lines from the surface to the sensing circuitry.

A further object of the present invention is to provide for a borehole compass instrument in which a compass unit is employed in combination with a light emiter and light-activated transistor to sense the orientation of the instrument in a hole or remote location in a reliable and efficient manner.

In accordance with the present invention, a downhole compass apparatus is characterized in particular by being a self-contained apparatus in which the necessary sensing circuitry and power source are contained within a chamber which is adapted for suspension for extended distances into a borehole, such as, an oil well for the purpose of sensing direction and specifically in determining orientation of objects in the well. The preferred form of instrument comprises a compass unit employed in combination with a light-emitting diode and light-activated transistor, the latter connected into a sensing circuit for the purpose of generating an audible tone in response to alignment of a clear area on the dial or disc of a compass with the light-activating transistor. The necessary power source for the sensing circuit is mounted in direct association with the circuitry and the compass unit in a common casing, and the tone generated is transmitted over the same electrical leads required for activation of the power source from the earth's surface. At the earth's surface, a detector box contains a power on-off switch and earphone jack to enable the operator to hear the audible tone generated by the sensing circuit.

The above and other objects, advantages and features of the present invention will become more readily appreciated and understood from the foregoing detailed description of a preferred embodiment when taken together with the accompanying drawings, in which:

BRIEF DESCRIPTION OF THE DRAWINGS

FIG. 1 is a cross-sectional view of a preferred form of instrument in accordance with the present invention;

FIG. 2 is a view partially in section of the control panel and instrument shown in FIG. 1 and with the compass enlarged and shown in cross-section; and FIG. 3 is a schematic diagram of the sensing circuit employed in the instrument for the purpose of signaling when the compass is oriented in a desired location.

DETAILED DESCRIPTION OF THE PREFERRED EMBODIMENT

Referring in detail to the drawings, the preferred form of apparatus in accordance with the present invention comprises two major components, the one component being a self-contained compass 10 which includes the necessary sensing circuit 12 and power source 13 assembled together within a common casing 14 which is adapted for suspension by means of a cable 15 for extended distances downwardly through a borehole B. The cable 15 houses the necessary wires 16 for electrical connection of the sensing circuit to a detector box or control panel 18 which is located at the earth's surface. As represented in FIG. 2, the detector box 18 contains a power on-off switch 20, a battery charge jack 21 and an earphone jack 22 which are electrically connected in the manner shown in FIG. 3 through the electrical leads 16 to the sensing circuit 12. The electrical leads or wires 16 include a ground wire 16a and positive and negative wires, 16b and 16c, respectively, which extend continuously through the cable 15 and the interior of the casing 14 for connection to terminals 24 on the sensing circuit 12. The power source 13 is comprised of a plurality of batteries connected in series, and in a well-known manner opposite ends of the batteries are connected by positive and negative leads 25 and 26 into the terminal 24 on the sensing circuit.

Generally, the compass 10 of the present invention is a relatively long, slender magnetic compass unit which is capable of determining magnetic North. Specifically, when the casing 14 is rotated until a reference point R is pointing to magnetic North, a tone is generated through the sensing circuit 12 and transmitted via the wires 16 to the remote detector box 18 at the surface.

Although this tone may be detected at the surface by various means, such as an AC volt meter, oscilliscope or earphone, in the preferred form an earphone jack 22 is provided so as to permit direct plug-in of an earphone unit, not shown. By virtue of this arrangement, it is possible to turn the system on and off through the control switch 20 at the surface via the same wires 16 used to transmit the audible tone back to the detector box 18 at the earth's surface.

For this purpose, and as best seen from FIG. 1, the compass 10 comprises an opaque disc 30 having an inner recess 32 suspended on jewel bearing 33, and a pair of magnets 34 are attached to the disc in diametrically opposed relation to one another. The disc assembly as described is mounted within a fluid-filled, transparent vial 35 which is in communication with an opening 36 into an upper cylinder 38, the latter serving to permit expansion and contraction of the fluid within the vial. The transparent vial assembly 35 is mounted on an aperture board 40 which is positioned in a recessed portion 42 of the casing 14 and at a point adjacent to the extreme lower end of the casing.

In order to detect when the compass is pointed North, the disc 30 is provided with a transparent area 43 of limited width which when pointed North will align itself between an I.R. emitter 44 mounted on the underside of the board 40 and a light sensor in the form of phototransistor 45 aligned with the emitter 44 on the upper end of the board 40. The transistor 45 will detect I.R. energy from the emitter 44 passing through the clear area 43 on the disc 30 when the compass is pointed North. The emitter 44 and sensor 45 both are electrically connected to terminal 64 at the lower end of the sensor circuit 12, as shown.

Preferably, the casing 14 is disposed in inner spaced concentric relation to an outer aluminum housing 48 which has an end cap 49 threadedly connected to the lower end of the housing 48, and the casing 14 has its lower end disposed in surrounding relation to an upper reduced end 50 of the end cap 49. Similarly, an upper end cap 51 is threadedly connected to the upper end of the housing 48, as illustrated in FIG. 1, and has a reduced lower end portion 52 which is insertable into the upper end of the casing 14 with the casing 14 locked in place by suitable fasteners 53. In this relation, the sensing circuit 12 and power source 13 are arranged in end-to-end relation to one another and to the upper end of the compass within the casing 14 so as to be completely isolated from the external housing 48.

Referring to the schematic diagram of the sensor circuit shown in FIG. 3, closing the switch 20 located on the detector box will activate transistor 66, thus supplying power to the circuit from the power source 13. The casing 14 is rotated until the emitter 44 and sensor 45 are advanced into alignment with the transparent area 43 on the compass, at which point the sensor 45 will generate a signal in response to the light beam from the emitter 44, thereby indicating that the casing is pointed North. The signal generated is amplified and shaped by operational amplifier 72, inverter 77, oscillator 78 and voltage modulator 80 to cause a square wave signal to appear at pin 67 in the circuit. This signal is superimposed on the DC level at the junction of resistor 68 and resistor 69, then is transmitted through the transmission wires 16 to the surface and is applied across the resistor 70 in the detector box. In the sensing circuit, the operational amplifier 72 serves as a level detector with hysteresis. When the voltage developed across resistor 74 from pin 75 goes low, causing pin 76 at the input of amplifier 77 to go high, it will unclamp the oscillator amplifier 78. Amplifier 80 modulates the voltage of the signal generated into a square wave signal before it is transmitted to the detector box 18. As an illustration, the signal generated by a TIL 604 photoswitch 45 and applied through ICI LM 339 amplifiers 72, 76, 78 and 80 and 600 kilohertz.

It will be appreciated that the ability to utilize the wires 16 both to activate the circuit and to return the signal generated, coupled with the utilization of a power source in direct association with the sensing circuit substantially reduces both the size and number of wires that must be extended from the surface to the downhole compass instrument. As a result, it is possible to extend the unit considerable distances on the order of 10,000' while reducing the cost and weight of the entire apparatus.

Although the present invention has been described with particularly relative to the foregoing detailed description of the preferred embodiment, various modifications, changes, additions and applications other than those specifically mentioned herein will be readily apparent to those having normal skill in the art without departing from the spirit and scope of this invention.

I claim:

1. In a downhole compass apparatus for orienting and sensing the direction of an instrument in a borehole wherein the instrument is extended from the earth's surface in a substantially vertical direction, the combination therewith comprising:

a hollow casing;

a compass unit mounted in said casing including a transducer board mounted in an opening formed in a wall of said casing, a transparent, fluid-filled vial mounted on said transducer board including expansion column means in direct communication with the interior of said vial to accommodate expansion and contraction of fluid within said vial, and a movable magnetic field-responsive portion in said vial provided with a transparent area extending in a predetermined direction with respect to magnetic North;

light-emitting means on said transducer board alignable with said transparent area for transmitting a light beam therethrough;

light-sensing means mounted on said transducer board being aligned with said light-emitting means to sense said light beam when said light-emitting means is aligned with said transparent area, said light-sensing means and light-emitting means vertically aligned on opposite sides of said magnetic field-responsive portion, and said transparent area extending in a radial direction to intercept the path of light betweeen said light-emitting means and light-sensing means;

signal generating means in said casing and associated with said light-sensing means and light-emitting means to generate a control signal in response to the light beam sensed by said light-sensing means and to transmit same to the earth's surface; and a signal detector at the earth's surface including transmission wires extending between said signal detector and said signal-generating means, said signal detector having an on-off switch connected to said transmission wires, said signal-generating means operative to transmit signals through said transmission wires to said power source in response to closure of said on-off switch.

2. In apparatus according to claim 1, said control signal generated being an audible tone.

3. In apparatus according to claim 1, said power source being defined by a plurality of series-connected batteries arranged in end-to-end relation to one another in said casing.

4. In a downhole compass apparatus according to claim 1, a suspension cable extending between said signal detector and said casing, and electrical transmission wires extending through said cable between said signal detector and said signal-generating means on said casing.

* * * * *